US012807750B2

(12) United States Patent
Isaka et al.

(10) Patent No.: US 12,807,750 B2
(45) Date of Patent: *Nov. 24, 2026

(54) COPOLYMER, FORMED ARTICLE AND INJECTION MOLDED ARTICLE

(71) Applicant: DAIKIN INDUSTRIES, LTD., Osaka (JP)

(72) Inventors: Tadaharu Isaka, Osaka (JP); Yumi Zenke, Osaka (JP); Yukari Yamamoto, Osaka (JP); Hayato Tsuda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/888,386

(22) Filed: Sep. 18, 2024

(65) Prior Publication Data

US 2025/0011488 A1 Jan. 9, 2025

Related U.S. Application Data

(63) Continuation of application No. PCT/JP2023/013284, filed on Mar. 30, 2023.

(30) Foreign Application Priority Data

Mar. 30, 2022 (JP) ................................ 2022-055215
Aug. 26, 2022 (JP) ................................ 2022-135152

(51) Int. Cl.
*C08F 214/26* (2006.01)

(52) U.S. Cl.
CPC ...... *C08F 214/262* (2013.01); *C08F 2800/20* (2013.01)

(58) Field of Classification Search
CPC .............. C08F 214/262; C08F 2500/12; C08F 216/1408; C09D 127/18; H01B 3/445; H01B 3/44; H01B 7/02; H01B 3/441
USPC ......... 264/113, 127, 173.11, 173.13, 173.14; 526/247
See application file for complete search history.

(56) References Cited

U.S. PATENT DOCUMENTS 3,635,926 A 1/1972 Gresham et al.
3,945,786 A 3/1976 Bishop
4,029,868 A 6/1977 Carlson
4,262,101 A 4/1981 Hartwimmer et al.
4,414,356 A 11/1983 Michel
4,510,300 A 4/1985 Levy
4,743,658 A 5/1988 Imbalzano et al.
4,902,444 A 2/1990 Kolouch
4,999,221 A 3/1991 Eigenbrod et al.
5,000,875 A 3/1991 Kolouch
5,656,392 A 8/1997 Sano et al.
5,703,185 A 12/1997 Blair
5,767,198 A 6/1998 Shimizu et al.
5,851,693 A 12/1998 Sano et al.
6,066,707 A * 5/2000 Colaianna ........... C08F 214/262 526/247
6,069,215 A 5/2000 Araki et al.
6,096,795 A 8/2000 Abusleme et al.
6,689,833 B1 2/2004 Bidstrup et al.
6,713,183 B2 3/2004 Araki et al.
6,740,375 B1 5/2004 Sagisaka et al.
6,774,196 B1 8/2004 Taira et al.
8,143,351 B2 3/2012 Shiotsuki et al.
9,963,564 B2 5/2018 Imamura et al.
11,826,975 B2 11/2023 Imamura et al.
2002/0011692 A1 1/2002 Lahijani
2002/0099143 A1 7/2002 Namura
2002/0167115 A1 11/2002 Tanaka
2003/0013791 A1 1/2003 Blong et al.
2003/0109646 A1 6/2003 Kubo et al.
2003/0114615 A1 6/2003 Sumi et al.
2003/0190530 A1 10/2003 Yang et al.
2003/0216531 A1 11/2003 Aten et al.
2004/0072935 A1 4/2004 Blong et al.
2004/0102572 A1 5/2004 Kubo et al.
2004/0204536 A1 10/2004 Miyatani et al.
2004/0260044 A1 12/2004 Earnest, Jr. et al.
2005/0020792 A1 * 1/2005 Aoyama ................... C08F 8/22 526/250
2005/0245626 A1 * 11/2005 Hoaglund .............. C08J 9/0066 521/91
2007/0112155 A1 5/2007 Takase et al.
2007/0149734 A1 6/2007 Sakakibara et al.
(Continued)

FOREIGN PATENT DOCUMENTS

CN 1527852 A 9/2004
CN 1599757 A 3/2005
(Continued)

OTHER PUBLICATIONS

European Search Report issued Feb. 10, 2025 for European Patent Application No. 22759283.9.
European Search Report issued Feb. 20, 2025 for European Patent Application No. 22759263.1.
Translation of the International Search Report issued Oct. 13, 2020 in International Application No. PCT/JP2020/032236.
Translation of the International Search Report issued Oct. 13, 2020 in International Application No. PCT/JP2020/032237.
Translation of the International Search Report issued Oct. 13, 2020 in International Application No. PCT/JP2020/032238.
(Continued)

*Primary Examiner* — Mark S Kaucher
(74) *Attorney, Agent, or Firm* — Sughrue Mion, PLLC

(57) ABSTRACT

There is provided a copolymer containing tetrafluoroethylene unit and perfluoro(propyl vinyl ether) unit, wherein the copolymer has a content of perfluoro(propyl vinyl ether) unit of 4.4 to 5.28 by mass with respect to the whole of the monomer units, a melt flow rate at 372° C. of 11.0 to 16.0 g/10 min, and the number of functional groups of 50 or less per $10^6$ main-chain carbon atoms.

4 Claims, No Drawings

(56) References Cited

U.S. PATENT DOCUMENTS

2007/0281166 A1 12/2007 Nishio
2007/0292685 A1 12/2007 Brothers et al.
2008/0038627 A1 2/2008 Yamauchi et al.
2008/0114143 A1 5/2008 Brothers et al.
2008/0241534 A1 10/2008 Ohtani et al.
2009/0038821 A1 2/2009 Sato et al.
2009/0044965 A1 2/2009 Kono et al.
2009/0176952 A1 7/2009 Funaki et al.
2009/0246435 A1 10/2009 Shimono et al.
2010/0063214 A1 3/2010 Kasahara et al.
2010/0212929 A1 8/2010 Ishii et al.
2010/0273047 A1 10/2010 Kunoike et al.
2010/0314153 A1 12/2010 Ishii et al.
2010/0314154 A1 12/2010 Kitahara et al.
2011/0052970 A1 3/2011 Kurata et al.
2011/0052977 A1 3/2011 Kurata et al.
2011/0104562 A1 5/2011 Byun et al.
2011/0203830 A1 8/2011 Kono et al.
2011/0272173 A1 11/2011 Shiotsuki et al.
2012/0035329 A1 2/2012 Isogai et al.
2012/0064273 A1 3/2012 Bacino
2012/0094169 A1 4/2012 Kim et al.
2013/0046058 A1* 2/2013 Pham .................. C08F 214/262 264/239
2013/0130100 A1 5/2013 Kurata et al.
2014/0227533 A1 8/2014 Murakami et al.
2014/0287177 A1 9/2014 Suda et al.
2014/0378616 A1 12/2014 Nakano et al.
2015/0041145 A1 2/2015 Colaianna et al.
2015/0148481 A1 5/2015 Brothers et al.
2015/0158988 A1 6/2015 Sawaki et al.
2015/0322187 A1 11/2015 Miele et al.
2015/0353700 A1 12/2015 Isaka et al.
2016/0006004 A1 1/2016 Ogawa et al.
2016/0078979 A1 3/2016 Hosoda et al.
2016/0108159 A1 4/2016 Sekiguchi et al.
2016/0194491 A1* 7/2016 Taguchi .................. C08L 27/20 428/379
2016/0272805 A1 9/2016 Nakanishi et al.
2016/0319089 A1 11/2016 Imamura et al.
2016/0322128 A1 11/2016 Imamura et al.
2016/0340455 A1 11/2016 Abe et al.
2017/0008986 A1 1/2017 Isaka et al.
2017/0025204 A1 1/2017 Chapman et al.
2017/0154707 A1 6/2017 Abe et al.
2017/0214037 A1 7/2017 Uematsu et al.
2017/0260344 A1 9/2017 Imamura et al.
2018/0009204 A1 1/2018 Higuchi et al.
2018/0036931 A1 2/2018 Higuchi et al.
2018/0237566 A1 8/2018 Aida et al.
2018/0265654 A1 9/2018 Imamura et al.
2018/0283590 A1 10/2018 Yokoyama et al.
2019/0134939 A1 5/2019 Colaianna et al.
2019/0143628 A1 5/2019 Colaianna et al.
2019/0177453 A1 6/2019 Isaka et al.
2019/0193315 A1 6/2019 Miyamoto et al.
2019/0375929 A1 12/2019 Nishimura et al.
2019/0382544 A1* 12/2019 Yokotani ................. C08L 27/18
2020/0332037 A1 10/2020 Isaka et al.
2021/0008827 A1 1/2021 Colaianna et al.
2021/0008828 A1 1/2021 Colaianna et al.
2021/0024709 A1 1/2021 Fukushima et al.
2021/0024769 A1 1/2021 Imamura et al.
2021/0189031 A1 6/2021 Hintzer et al.
2021/0246237 A1 8/2021 Isaka et al.
2021/0269568 A1 9/2021 Imamura et al.
2022/0001657 A1 1/2022 Kikuchi et al.
2022/0033636 A1 2/2022 Nishimura et al.
2022/0170573 A1 6/2022 Imamura et al.
2022/0181689 A1 6/2022 Isaka et al.
2022/0181698 A1 6/2022 Isaka et al.
2022/0181729 A1 6/2022 Isaka et al.
2022/0195088 A1 6/2022 Imamura et al.
2022/0213996 A1 7/2022 Imamura et al.
2022/0266485 A1 8/2022 Tsuda et al.
2022/0278403 A1 9/2022 Isaka et al.
2023/0227594 A1 7/2023 Yamamoto et al.
2023/0235107 A1 7/2023 Isaka et al.
2023/0235159 A1 7/2023 Isaka et al.
2023/0235160 A1 7/2023 Isaka et al.
2023/0238627 A1 7/2023 Isaka et al.
2023/0238628 A1 7/2023 Zenke et al.
2023/0238629 A1 7/2023 Isaka et al.
2023/0272136 A1 8/2023 Zenke et al.
2023/0295356 A1 9/2023 Isaka et al.
2023/0344077 A1 10/2023 Qiu et al.
2023/0383031 A1 11/2023 Isaka et al.
2023/0383032 A1 11/2023 Isaka et al.
2023/0383033 A1 11/2023 Zenke et al.
2023/0383034 A1 11/2023 Isaka et al.
2023/0390977 A1 12/2023 Hamada et al.
2023/0390978 A1 12/2023 Tsuda et al.
2023/0390979 A1 12/2023 Tsuda et al.
2023/0390980 A1 12/2023 Tsuda et al.
2023/0390981 A1 12/2023 Tsuda et al.
2023/0391909 A1 12/2023 Isaka et al.
2023/0391910 A1 12/2023 Isaka et al.
2023/0391911 A1 12/2023 Isaka et al.
2023/0391912 A1 12/2023 Isaka et al.
2023/0391917 A1 12/2023 Isaka et al.
2023/0391920 A1 12/2023 Isaka et al.
2023/0391927 A1 12/2023 Isaka
2023/0391929 A1 12/2023 Isaka et al.
2023/0391931 A1 12/2023 Isaka et al.
2023/0391932 A1 12/2023 Isaka et al.
2023/0391933 A1 12/2023 Isaka et al.
2023/0392737 A1 12/2023 Tsuda et al.
2023/0395282 A1 12/2023 Isaka et al.
2023/0399431 A1 12/2023 Isaka et al.
2023/0399432 A1 12/2023 Isaka et al.
2023/0399438 A1 12/2023 Isaka et al.
2023/0399441 A1 12/2023 Isaka et al.
2023/0399443 A1 12/2023 Isaka et al.
2023/0406975 A1 12/2023 Isaka et al.
2023/0406976 A1 12/2023 Isaka et al.
2023/0411751 A1 12/2023 Tsuda et al.
2023/0415387 A1 12/2023 Hamada et al.
2025/0002728 A1 1/2025 Zenke et al.
2025/0011490 A1 1/2025 Isaka et al.
2025/0011494 A1 1/2025 Isaka et al.
2025/0011496 A1 1/2025 Yamamoto et al.
2025/0011498 A1 1/2025 Isaka et al.
2025/0011499 A1 1/2025 Isaka et al.
2025/0011500 A1 1/2025 Isaka et al.
2025/0019476 A1 1/2025 Isaka et al.
2025/0034302 A1 1/2025 Isaka et al.

FOREIGN PATENT DOCUMENTS

CN 101364456 A 2/2009
CN 103946250 A 7/2014
CN 107428144 A 12/2017
CN 109476061 3/2019
CN 110712348 A 1/2020
CN 110790854 A 2/2020
CN 114223086 A 3/2022
CN 114258609 A 3/2022
CN 116390957 A 7/2023
CN 116867821 A 10/2023
CN 116917346 A 10/2023
EP 0 220 910 A2 5/1987
EP 0 423 995 A1 4/1991
EP 0 976 544 A1 2/2000
EP 1 260 526 A1 11/2002
EP 1 462 458 A1 9/2004
EP 3816214 A1 * 5/2021 .......... C08F 214/262
EP 4 024 550 A1 7/2022
EP 4 024 575 A1 7/2022
EP 4 223 793 A1 8/2023
EP 4 223 794 A1 8/2023
GB 1210794 A 10/1970
JP 48-20788 B1 6/1973
JP 58-132512 A 8/1983
JP 58-191127 A 11/1983

(56) References Cited

FOREIGN PATENT DOCUMENTS

| | | | |
|---|---|---|---|
| JP | 59-120433 A | 7/1984 | |
| JP | 62-104822 A | 5/1987 | |
| JP | 62-53019 B2 | 11/1987 | |
| JP | 1-53167 B2 | 11/1989 | |
| JP | 2-129253 A | 5/1990 | |
| JP | 3-184209 A | 8/1991 | |
| JP | 3-247609 A | 11/1991 | |
| JP | 4-357398 A | 12/1992 | |
| JP | 6-1902 A | 1/1994 | |
| JP | 6-40813 B2 | 6/1994 | |
| JP | 6-287405 A | 10/1994 | |
| JP | 7-16869 A | 1/1995 | |
| JP | 7-112449 A | 5/1995 | |
| JP | 7-188337 A | 7/1995 | |
| JP | 7-290496 A | 11/1995 | |
| JP | 8-207106 A | 8/1996 | |
| JP | 8-321287 A | 12/1996 | |
| JP | 9-245832 A | 9/1997 | |
| JP | 10-87746 A | 4/1998 | |
| JP | 10-158456 A | 6/1998 | |
| JP | 10-275604 A | 10/1998 | |
| JP | 10-292054 A | 11/1998 | |
| JP | 2001-151825 A | 6/2001 | |
| JP | 2001-151826 A | 6/2001 | |
| JP | 2001-283907 A | 10/2001 | |
| JP | 2001-283921 A | 10/2001 | |
| JP | 2002-53620 A | 2/2002 | |
| JP | 2002-63934 A | 2/2002 | |
| JP | 2002-167488 A | 6/2002 | |
| JP | 2003-327770 A | 11/2003 | |
| JP | 2003-534940 A | 11/2003 | |
| JP | 2004-256406 A | 9/2004 | |
| JP | 2004-534131 A | 11/2004 | |
| JP | 2005-523979 A | 8/2005 | |
| JP | 2005-298659 A | 10/2005 | |
| JP | 2005-320497 A | 11/2005 | |
| JP | 2006-117912 A | 5/2006 | |
| JP | 2006-312736 A | 11/2006 | |
| JP | 2007-238960 A | 9/2007 | |
| JP | 2008-66254 A | 3/2008 | |
| JP | 2009-42478 A | 2/2009 | |
| JP | 2009-59690 A | 3/2009 | |
| JP | 2009-235564 A | 10/2009 | |
| JP | 2009-272207 A | 11/2009 | |
| JP | 2010-56079 A | 3/2010 | |
| JP | 2010-509443 A | 3/2010 | |
| JP | 2010-85741 A | 4/2010 | |
| JP | 2010-162817 A | 7/2010 | |
| JP | 2010-235667 A | 10/2010 | |
| JP | 2011-48976 A | 3/2011 | |
| JP | 2011-71104 A | 4/2011 | |
| JP | 2012-54269 A | 3/2012 | |
| JP | 2012-80911 A | 4/2012 | |
| JP | 2012-106494 A | 6/2012 | |
| JP | 2012-130557 A | 7/2012 | |
| JP | 2013-71341 A | 4/2013 | |
| JP | 2013-82888 A | 5/2013 | |
| JP | 2013-177574 A | 9/2013 | |
| JP | 2014-28951 A | 2/2014 | |
| JP | 2014-59052 A | 4/2014 | |
| JP | 2014-187040 A | 10/2014 | |
| JP | 2015-7218 A | 1/2015 | |
| JP | 2015-519410 A | 7/2015 | |
| JP | 2015-147924 A | 8/2015 | |
| JP | 2015-168840 A | 9/2015 | |
| JP | 2016-537499 A | 12/2016 | |
| JP | 2017-197690 A | 11/2017 | |
| JP | 2018-20468 A | 2/2018 | |
| JP | 2018-514598 A | 6/2018 | |
| JP | 2018-523272 A | 8/2018 | |
| JP | 2018-159090 A | 10/2018 | |
| JP | 2019-172962 A | 10/2019 | |
| JP | 2019-210420 A | 12/2019 | |
| JP | 2019-214641 A | 12/2019 | |
| JP | 2020-2341 A | 1/2020 | |
| JP | 2020-15906 A | 1/2020 | |
| JP | 2020-29042 A | 2/2020 | |
| JP | 2020-100823 A | 7/2020 | |
| JP | 2020-100843 A | 7/2020 | |
| JP | 2021-6648 A | 1/2021 | |
| JP | 2021-141043 A | 9/2021 | |
| JP | 2021-141045 A | 9/2021 | |
| JP | 2022-19196 A | 1/2022 | |
| KR | 10-2004-0071160 A | 8/2004 | |
| KR | 10-2013-0069652 A1 | 6/2013 | |
| KR | 10-2019-0034205 A | 4/2019 | |
| WO | 95/29956 A1 | 11/1995 | |
| WO | 01/40331 A1 | 6/2001 | |
| WO | 03/006566 A1 | 1/2003 | |
| WO | 03/048214 A1 | 6/2003 | |
| WO | 2004/052987 A1 | 6/2004 | |
| WO | 2008/032613 A1 | 3/2008 | |
| WO | 2008/047759 A1 | 4/2008 | |
| WO | 2008/047906 A1 | 4/2008 | |
| WO | 2008/143069 A1 | 11/2008 | |
| WO | 2010/113864 A1 | 10/2010 | |
| WO | 2013/115374 A1 | 8/2013 | |
| WO | 2014/007346 A1 | 1/2014 | |
| WO | 2014/129413 A1 | 8/2014 | |
| WO | 2015/119053 A1 | 8/2015 | |
| WO | 2016/117492 A1 | 7/2016 | |
| WO | 2017/056203 A1 | 4/2017 | |
| WO | 2017/082417 A1 | 5/2017 | |
| WO | 2019/003265 A1 | 1/2019 | |
| WO | 2019/187725 A1 | 10/2019 | |
| WO | 2019/189316 A1 | 10/2019 | |
| WO | 2019/208492 A1 | 10/2019 | |
| WO | WO-2020004083 A1 * | 1/2020 | .......... C08F 214/262 |
| WO | 2020/090981 A1 | 5/2020 | |
| WO | 2020/130144 A1 | 6/2020 | |
| WO | 2020/204163 A1 | 10/2020 | |
| WO | 2021/033539 A1 | 2/2021 | |
| WO | 2021/039862 A1 | 3/2021 | |
| WO | 2021/039863 A1 | 3/2021 | |
| WO | 2021/039865 A1 | 3/2021 | |
| WO | 2021039861 A1 | 3/2021 | |
| WO | 2021039864 A1 | 3/2021 | |
| WO | 2021/059753 A1 | 4/2021 | |
| WO | 2022/181225 A1 | 1/2022 | |
| WO | 2022/181231 A1 | 9/2022 | |
| WO | 2022/181232 A1 | 9/2022 | |

OTHER PUBLICATIONS

Translation of the International Search Report issued Oct. 13, 2020 in International Application No. PCT/JP2020/032239.

Translation of the International Search Report issued Oct. 6, 2020 in International Application No. PCT/JP2020/032234.

International Preliminary Report on Patentability, with Translation of Written Opinion issued Mar. 1, 2022 in International Application No. PCT/JP2020/032238.

International Preliminary Report on Patentability, with Translation of Written Opinion issued Mar. 1, 2022 in International Application No. PCT/JP2020/032239.

International Preliminary Report on Patentability, with Translation of Written Opinion issued Mar. 1, 2022 in International Application No. PCT/JP2020/032236.

International Preliminary Report on Patentability, with Translation of Written Opinion issued Mar. 1, 2022 in International Application No. PCT/JP2020/032237.

International Preliminary Report on Patentability, with Translation of Written Opinion issued Mar. 1, 2022 in International Application No. PCT/JP2020/032234.

Translation of the International Search Report dated Dec. 21, 2021 in International Application No. PCT/JP2021/036301.

Translation of the International Search Report dated Dec. 21, 2021 in International Application No. PCT/JP2021/036302.

Translation of the International Search Report dated Dec. 21, 2021 in International Application No. PCT/JP2021/036303.

Translation of the International Search Report dated Nov. 9, 2021 in International Application No. PCT/JP2021/036304.

(56) References Cited

OTHER PUBLICATIONS

Translation of the International Search Report dated Apr. 12, 2022 in International Application No. PCT/JP2022/003643.
Translation of the International Search Report dated Nov. 1, 2021 in International Application No. PCT/JP2021/036305.
Translation of the International Search Report dated Nov. 22, 2021 in International Application No. PCT/JP2021/036306.
Translation of the International Search Report dated Nov. 22, 2021 in International Application No. PCT/JP2021/036307.
Translation of the International Search Report dated Nov. 22, 2021 in International Application No. PCT/JP2021/036308.
Translation of the International Search Report dated Nov. 22, 2021 in International Application No. PCT/JP2021/036309.
Translation of the International Search Report dated Nov. 22, 2021 in International Application No. PCT/JP2021/036310.
Translation of the International Search Report dated Apr. 19, 2022 in International Application No. PCT/JP2022/003634.
Translation of the International Search Report dated Apr. 19, 2022 in International Application No. PCT/JP2022/003636.
Translation of the International Search Report dated Apr. 5, 2022 in International Application No. PCT/JP2022/003637.
Translation of the International Search Report dated Apr. 5, 2022 in International Application No. PCT/JP2022/003638.
Translation of the International Search Report dated Apr. 5, 2022 in International Application No. PCT/JP2022/003640.
Translation of the International Search Report dated Apr. 5, 2022 in International Application No. PCT/JP2022/003641.
Translation of the International Search Report dated Apr. 12, 2022 in International Application No. PCT/JP2022/003642.
Translation of the International Search Report dated Apr. 19, 2022 in International Application No. PCT/JP2022/003644.
Translation of the International Search Report dated Apr. 19, 2022 in International Application No. PCT/JP2022/003645.
Translation of the International Search Report dated Apr. 12, 2022 in International Application No. PCT/JP2022/003646.
Translation of the International Search Report dated Apr. 12, 2022 in International Application No. PCT/JP2022/003647.
Translation of the International Search Report dated Mar. 8, 2022 in International Application No. PCT/JP2022/003648.
Translation of the International Search Report dated Apr. 19, 2022 in International Application No. PCT/JP2022/003649.
Translation of the International Search Report dated Apr. 19, 2022 in International Application No. PCT/JP2022/003650.
Translation of the International Search Report dated Apr. 19, 2022 in International Application No. PCT/JP2022/003651.
Translation of the International Search Report dated Mar. 22, 2022 in International Application No. PCT/JP2022/003652.
Translation of the International Search Report dated Apr. 19, 2022 in International Application No. PCT/JP2022/003653.
Translation of the International Search Report dated Apr. 19, 2022 in International Application No. PCT/JP2022/003654.
Translation of the International Search Report dated Mar. 22, 2022 in International Application No. PCT/JP2022/003657.
Translation of the International Search Report dated Mar. 22, 2022 in International Application No. PCT/JP2022/003658.
Translation of the International Search Report dated Apr. 19, 2022 in International Application No. PCT/JP2022/003659.
Translation of the International Search Report dated Mar. 8, 2022 in International Application No. PCT/JP2022/003660.
Translation of the International Search Report dated Mar. 15, 2022 in International Application No. PCT/JP2022/003661.
Translation of the International Search Report dated Apr. 19, 2022 in International Application No. PCT/JP2022/003664.
Translation of the International Search Report dated Apr. 19, 2022 in International Application No. PCT/JP2022/003665.
Translation of the International Search Report dated May 24, 2022 in International Application No. PCT/JP2022/007735.
Translation of the International Search Report dated May 17, 2022 in International Application No. PCT/JP2022/007737.
Translation of the International Search Report dated May 10, 2022 in International Application No. PCT/JP2022/007738.
Translation of the International Search Report dated Apr. 19, 2022 in International Application No. PCT/JP2022/003635.
International Preliminary Report on Patentability, with Translation of Written Opinion issued Mar. 28, 2023 in International Application No. PCT/JP2021/036301.
International Preliminary Report on Patentability, with Translation of Written Opinion issued Mar. 28, 2023 in International Application No. PCT/JP2021/036302.
International Preliminary Report on Patentability, with Translation of Written Opinion issued Mar. 28, 2023 in International Application No. PCT/JP2021/036303.
International Preliminary Report on Patentability, with Translation of Written Opinion issued Mar. 28, 2023 in International Application No. PCT/JP2021/036304.
International Preliminary Report on Patentability, with Translation of Written Opinion issued Mar. 28, 2023 in International Application No. PCT/JP2021/036305.
International Preliminary Report on Patentability, with Translation of Written Opinion issued Mar. 28, 2023 in International Application No. PCT/JP2021/036306.
International Preliminary Report on Patentability, with Translation of Written Opinion issued Mar. 28, 2023 in International Application No. PCT/JP2021/036307.
International Preliminary Report on Patentability, with Translation of Written Opinion issued Mar. 28, 2023 in International Application No. PCT/JP2021/036308.
International Preliminary Report on Patentability, with Translation of Written Opinion issued Mar. 28, 2023 in International Application No. PCT/JP2021/036309.
International Preliminary Report on Patentability, with Translation of Written Opinion issued Mar. 28, 2023 in International Application No. PCT/JP2021/036310.
European Search Report issued Aug. 2, 2023 for European Patent Application No. 20 857 704.9.
International Preliminary Report on Patentability, with Translation of Written Opinion issued Aug. 29, 2023 in International Application No. PCT/JP2022/003634.
International Preliminary Report on Patentability, with Translation of Written Opinion issued Aug. 29, 2023 in International Application No. PCT/JP2022/003635.
International Preliminary Report on Patentability, with Translation of Written Opinion issued Aug. 29, 2023 in International Application No. PCT/JP2022/003636.
International Preliminary Report on Patentability, with Translation of Written Opinion issued Aug. 29, 2023 in International Application No. PCT/JP2022/003637.
International Preliminary Report on Patentability, with Translation of Written Opinion issued Aug. 29, 2023 in International Application No. PCT/JP2022/003638.
International Preliminary Report on Patentability, with Translation of Written Opinion issued Aug. 29, 2023 in International Application No. PCT/JP2022/003640.
International Preliminary Report on Patentability, with Translation of Written Opinion issued Aug. 29, 2023 in International Application No. PCT/JP2022/003641.
International Preliminary Report on Patentability, with Translation of Written Opinion issued Aug. 29, 2023 in International Application No. PCT/JP2022/003642.
International Preliminary Report on Patentability, with Translation of Written Opinion issued Aug. 29, 2023 in International Application No. PCT/JP2022/003643.
International Preliminary Report on Patentability, with Translation of Written Opinion issued Aug. 29, 2023 in International Application No. PCT/JP2022/003644.
International Preliminary Report on Patentability, with Translation of Written Opinion issued Aug. 29, 2023 in International Application No. PCT/JP2022/003645.
International Preliminary Report on Patentability, with Translation of Written Opinion issued Aug. 29, 2023 in International Application No. PCT/JP2022/003646.

(56) References Cited

OTHER PUBLICATIONS

International Preliminary Report on Patentability, with Translation of Written Opinion issued Aug. 29, 2023 in International Application No. PCT/JP2022/003647.
International Preliminary Report on Patentability, with Translation of Written Opinion issued Aug. 29, 2023 in International Application No. PCT/JP2022/003648.
International Preliminary Report on Patentability, with Translation of Written Opinion issued Aug. 29, 2023 in International Application No. PCT/JP2022/003649.
International Preliminary Report on Patentability, with Translation of Written Opinion issued Aug. 29, 2023 in International Application No. PCT/JP2022/003650.
International Preliminary Report on Patentability, with Translation of Written Opinion issued Aug. 29, 2023 in International Application No. PCT/JP2022/003651.
International Preliminary Report on Patentability, with Translation of Written Opinion issued Aug. 29, 2023 in International Application No. PCT/JP2022/003652.
International Preliminary Report on Patentability, with Translation of Written Opinion issued Aug. 29, 2023 in International Application No. PCT/JP2022/003653.
International Preliminary Report on Patentability, with Translation of Written Opinion issued Aug. 29, 2023 in International Application No. PCT/JP2022/003654.
International Preliminary Report on Patentability, with Translation of Written Opinion issued Aug. 29, 2023 in International Application No. PCT/JP2022/003657.
International Preliminary Report on Patentability, with Translation of Written Opinion issued Aug. 29, 2023 in International Application No. PCT/JP2022/003658.
International Preliminary Report on Patentability, with Translation of Written Opinion issued Aug. 29, 2023 in International Application No. PCT/JP2022/003659.
International Preliminary Report on Patentability, with Translation of Written Opinion issued Aug. 29, 2023 in International Application No. PCT/JP2022/003660.
International Preliminary Report on Patentability, with Translation of Written Opinion issued Aug. 29, 2023 in International Application No. PCT/JP2022/003661.
International Preliminary Report on Patentability, with Translation of Written Opinion issued Aug. 29, 2023 in International Application No. PCT/JP2022/003664.
International Preliminary Report on Patentability, with Translation of Written Opinion issued Aug. 29, 2023 in International Application No. PCT/JP2022/003665.
International Preliminary Report on Patentability, with Translation of Written Opinion issued Aug. 29, 2023 in International Application No. PCT/JP2022/007735.
International Preliminary Report on Patentability, with Translation of Written Opinion issued Aug. 29, 2023 in International Application No. PCT/JP2022/007737.
International Preliminary Report on Patentability, with Translation of Written Opinion issued Aug. 29, 2023 in International Application No. PCT/JP2022/007738.
Translation of the International Search Report dated Jun. 20, 2023 in International Application No. PCT/JP2023/013284.
Translation of the International Search Report dated Jun. 6, 2023 in International Application No. PCT/JP2023/013285.
Translation of the International Search Report dated Jun. 6, 2023 in International Application No. PCT/JP2023/013289.
Translation of the International Search Report dated Jun. 6, 2023 in International Application No. PCT/JP2023/013291.
Translation of the International Search Report dated Jun. 6, 2023 in International Application No. PCT/JP2023/013292.
Translation of the International Search Report dated Jun. 6, 2023 in International Application No. PCT/JP2023/013293.
Translation of the International Search Report dated Jun. 6, 2023 in International Application No. PCT/JP2023/013331.
Translation of the International Search Report dated Jun. 6, 2023 in International Application No. PCT/JP2023/013332.
Translation of the International Search Report dated Jun. 6, 2023 in International Application No. PCT/JP2023/013333.
Translation of the International Search Report dated Jun. 20, 2023 in International Application No. PCT/JP2023/013290.
European Search Report issued Oct. 20, 2023 for European Patent Application No. 20 856 953.3.
European Search Report issued Oct. 20, 2023 for European Patent Application No. 20 857 574.6.
European Search Report issued Oct. 20, 2023 for European Patent Application No. 20 857 843.5.
European Search Report issued Oct. 20, 2023 for European Patent Application No. 20 857 470.7.
International Search Report dated Jun. 20, 2023 in International Application No. PCT/JP2023/013284.
International Search Report dated Jun. 6, 2023 in International Application No. PCT/JP2023/013285.
International Search Report dated Jun. 6, 2023 for International Application No. PCT/JP2023/013289.
International Search Report dated Jun. 20, 2023 for International Application No. PCT/JP2023/013290.
International Search Report dated Jun. 6, 2023 for International Application No. PCT/JP2023/013291.
International Search Report dated Jun. 6, 2023 for International Application No. PCT/JP2023/013292.
International Search Report dated Jun. 6, 2023 for International Application No. PCT/JP2023/013293.
International Search Report dated Jun. 6, 2023 for International Application No. PCT/JP2023/013331.
International Search Report dated Jun. 6, 2023 for International Application No. PCT/JP2023/013332.
International Search Report dated Jun. 6, 2023 for International Application No. PCT/JP2023/013333.
International Preliminary Report on Patentability, with Translation of Written Opinion issued Sep. 24, 2024 in International Application No. PCT/JP2023/013284.
International Preliminary Report on Patentability, with Translation of Written Opinion issued Sep. 24, 2024 in International Application No. PCT/JP2023/013285.
International Preliminary Report on Patentability, with Translation of Written Opinion issued Sep. 24, 2024 in International Application No. PCT/JP2023/013289.
International Preliminary Report on Patentability, with Translation of Written Opinion issued Sep. 24, 2024 in International Application No. PCT/JP2023/013290.
International Preliminary Report on Patentability, with Translation of Written Opinion issued Sep. 24, 2024 in International Application No. PCT/JP2023/013291.
International Preliminary Report on Patentability, with Translation of Written Opinion issued Sep. 24, 2024 in International Application No. PCT/JP2023/013292.
International Preliminary Report on Patentability, with Translation of Written Opinion issued Sep. 24, 2024 in International Application No. PCT/JP2023/013293.
International Preliminary Report on Patentability, with Translation of Written Opinion issued Sep. 24, 2024 in International Application No. PCT/JP2023/013331.
International Preliminary Report on Patentability, with Translation of Written Opinion issued Sep. 24, 2024 in International Application No. PCT/JP2023/013332.
International Preliminary Report on Patentability, with Translation of Written Opinion issued Sep. 24, 2024 in International Application No. PCT/JP2023/013333.
European Search Report issued Aug. 27, 2024 for European Patent Application No. 21875831.6.
European Search Report issued Aug. 27, 2024 for European Patent Application No. 21875832.4.
European Search Report issued Aug. 29, 2024 for European Patent Application No. 21875833.2.
European Search Report issued Aug. 29, 2024 for European Patent Application No. 21875834.0.

(56) References Cited

OTHER PUBLICATIONS

European Search Report issued Sep. 9, 2024 for European Patent Application No. 21875826.6.
European Search Report issued Sep. 9, 2024 for European Patent Application No. 21875828.2.
European Search Report issued Sep. 9, 2024 for European Patent Application No. 21875829.0.
European Search Report issued Sep. 9, 2024 for European Patent Application No. 21875830.8.
European Search Report issued Sep. 10, 2024 for European Patent Application No. 21875835.7.
European Search Report issued Sep. 19, 2024 for European Patent Application No. 21875827.4.
European Search Report issued Dec. 4, 2024 for European Patent Application No. 22759287.0.
European Search Report issued Dec. 5, 2024 for European Patent Application No. 22759265.6.
European Search Report issued Dec. 10, 2024 for European Patent Application No. 22759267.2.
European Search Report issued Dec. 13, 2024 for European Patent Application No. 22 759 272.2.
European Search Report issued Dec. 16, 2024 for European Patent Application No. 22759276.3.
European Search Report issued Dec. 13, 2024 for European Patent Application No. 22759273.0.
European Search Report issued Dec. 19, 2024 for European Patent Application No. 22759264.9.
European Search Report issued Dec. 19, 2024 for European Patent Application No. 22759277.1.
European Search Report issued Jan. 2, 2025 for European Patent Application No. 22759281.3.
European Search Report issued Jan. 3, 2025 for European Patent Application No. 22759261.5.
European Search Report issued Jan. 3, 2025 for European Patent Application No. 22759274.8.
European Search Report issued Jan. 16, 2025 for European Patent Application No. 22759269.8.
European Search Report issued Jan. 14, 2025 for European Patent Application No. 22759282.1.
European Search Report issued Jan. 14, 2025 for European Patent Application No. 22759262.3.
European Search Report issued Jan. 16, 2025 for European Patent Application No. 22759284.7.
European Search Report issued Jan. 27, 2025 for European Patent Application No. 22759268.0.
European Search Report issued Jan. 27, 2025 for European Patent Application No. 22759285.4.
European Search Report issued Feb. 4, 2025 for European Patent Application No. 22759266.4.
Paolo Corbelli, "ASTM D638: tensile test for plastics", Jul. 30, 2024, XP093227725, Retrieved from the Internet: URL:https://www.cermacsrl.com/en/astm-d638-tensile-test-for-plastics/, pp. 1-9 (9 total pages).
Keun Park et al., "Eliminating weldlines of an injection-molded part with the aid of high-frequency induction heating", Journal of Mechanical Science and Technology, vol. 24, No. 1, XP055158055, 2010, pp. 149-152 (4 total pages).
Nanyang Zhao et al, "In situ flow state characterization of molten resin at the inner mold in injection molding", Journal of Applied Polymer Science, John Wiley & Sons, Inc, US, vol. 141, No. 9, XP072571824, 2023, pp. 1-16 (16 total pages).
Extended European Search Report dated Mar. 11, 2026 in application No. 23 780 928.0.
Extended European Search Report dated Mar. 11, 2026 in application No. 23 780 929.8.
Extended European Search Report dated Mar. 11, 2026 in application No. 23 780 936.3.
Extended European Search Report dated Mar. 11, 2026 in application No. 23 780 953.8.
Extended European Search Report dated Mar. 11, 2026 in application No. 23 780 954.6.
Extended European Search Report dated Mar. 11, 2026 in application No. 23 780 955.3.
Extended European Search Report dated Mar. 11, 2026 in application No. 23 780 932.2.
Extended European Search Report dated Mar. 11, 2026 in application No. 23 780 933.0.
Extended European Search Report dated Mar. 11, 2026 in application No. 23 780 934.8.

* cited by examiner

COPOLYMER, FORMED ARTICLE AND INJECTION MOLDED ARTICLE

CROSS-REFERENCE TO RELATED APPLICATIONS

This application is a Rule 53(b) Continuation of International Application No. PCT/JP2023/013284 filed Mar. 30, 2023, which claims priorities based on Japanese Patent Application No. 2022-055215 filed Mar. 30, 2022, and Japanese Patent Application No. 2022-135152 filed Aug. 26, 2022, the respective disclosures of which are incorporated herein by reference in their entirety.

TECHNICAL FIELD

The present disclosure relates to a copolymer, a formed article, and an injection molded article.

BACKGROUND ART

Patent Document 1 discloses a thermoplastic resin composition comprising a blend of (A) 0.1 to 99% by weight of a fluorine-containing polymer having methylol groups and a number average molecular weight of $5\times10^2$ to $5\times10^5$ and (B) 1 to 99.9% of a liquid crystal polyester, wherein the fluorine-containing polymer having methylol groups (A) is at least one selected from the group consisting of perfluoro type polymers having $2\times10^2$ to $1\times10^5$ methylol groups per $1\times10^6$ carbon atoms at its molecular chain end.

RELATED ART

Patent Documents

Patent Document 1: International Publication No. WO

SUMMARY

The present disclosure provides a copolymer comprising tetrafluoroethylene unit and perfluoro(propyl vinyl ether) unit, wherein the copolymer has a content of perfluoro (propyl vinyl ether) unit of 4.4 to 5.2% by mass with respect to the whole of the monomer units, a melt flow rate at 372° C. of 11.0 to 16.0 g/10 min, and the number of functional groups of 50 or less per $10^6$ main-chain carbon atoms.

Effects

The present disclosure is capable of providing a copolymer capable of readily providing a visually attractive injection molded article having various shapes, and capable of providing a formed article having excellent abrasion resistance at 60° C., low hydrogen permeability, high-temperature rigidity at 100° C., tensile creep resistance at 230° C., durability against repetitive load, solvent crack resistance, and durability against tensile force applied at 230° C.

DESCRIPTION OF EMBODIMENTS

Hereinafter, specific embodiments of the present disclosure will now be described in detail, but the present disclosure is not limited to the following embodiments.

The copolymer of the present disclosure contains tetrafluoroethylene (TFE) unit and perfluoro(propyl vinyl ether) (PPVE) unit.

According to Patent Document 1, perfluoro type fluororesins (e.g., PTFE, FEP, PFA and the like) can be used in a wide temperature range and have excellent chemical resistance, alkali resistance, acid resistance, water resistance, weather resistance, corrosion resistance, wear resistance, dielectric property and the like, and therefore are used in various applications such as lining materials for pipes, valves, pumps or the like, flexible tubes, films, wafer baskets, pump impellers, machine parts and chemical experimental instruments.

In addition, Patent Document 1 discloses that perfluoro type fluororesins in many cases have poor mechanical properties, physical thermal resistance indicated by a deflection temperature under load, dimensional stability indicated by a coefficient of linear expansion, moldability and the like, and proposes as a solution to such problems a thermoplastic resin composition containing a perfluoro type polymer having a methylol group at its terminal and a liquid crystal polyester.

However, it is preferable to improve the characteristics of a perfluoro-based fluororesin itself without blending another polymer such as a liquid crystal polyester because the applications of the perfluoro-based fluororesin can be further broadened.

It has been found that by suitably regulating the content of PPVE unit, the melt flow rate (MFR), and the number of functional groups of a copolymer containing TFE unit and PPVE unit, the formability of the copolymer is significantly improved and, at the same time, the use of such a copolymer makes it possible, without adding another polymer such as a liquid crystal polyester to the copolymer, to obtain a formed article having excellent abrasion resistance at 60° C., low hydrogen permeability, high-temperature rigidity at 100° C., tensile creep resistance at 230° C., durability against repetitive load, solvent crack resistance, and durability against tensile force applied at 230° C.

For example, the use of the copolymer of the present disclosure makes it possible to produce a piping member, a tube, a valve, and the like that unlikely wear out and deform and, moreover, unlikely allow hydrogen to permeate even when being brought into contact with a high-temperature fluid whose pressure changes frequently.

The copolymer of the present disclosure is a melt-fabricable fluororesin. The being melt-fabricable means that it is possible to melt and process a polymer by using a conventional processing device such as an extruder or an injection molding machine.

The content of PPVE unit of the copolymer is 4.4 to 5.2% by mass with respect to the whole of the monomer units. The content of PPVE unit of the copolymer is preferably 5.1% by mass or lower, more preferably 5.0% by mass or lower, still more preferably 4.9% by mass or lower, and further still more preferably 4.8% by mass or lower. An excessively high content of PPVE unit of the copolymer results in poor low hydrogen permeability, high-temperature rigidity at 100° C., tensile creep resistance at 230° C., and durability against repetitive load. An excessively low content of PPVE unit of the copolymer results in poor abrasion resistance at 60° C., solvent crack resistance, and durability against tensile force applied at 230° C.

The content of TFE unit of the copolymer is preferably 95.6% by mass or less, and is preferably 94.8% by mass or more, more preferably 94.9% by mass or more, even more preferably 95.0% by mass or more, yet more preferably 95.18 by mass or more, and particularly preferably 95.2% by mass or more with respect to the whole of the monomer units. An excessively low content of TFE unit of the copolymer may result in poor low hydrogen permeability, high-temperature rigidity at 100° C., tensile creep resistance at 230° C., and durability against repetitive load. An excessively high content of TFE unit of the copolymer may result in poor abrasion resistance at 60° C., solvent crack resistance, and durability against tensile force applied at 230° C.

In the present disclosure, the content of each monomer unit in the copolymer is measured by a $^{19}$F-NMR method.

The copolymer can also contain a monomer unit originated from a monomer that is copolymerizable with TFE and PPVE. In this case, the content of the monomer unit copolymerizable with TFE and PPVE is, with respect to the whole of the monomer units of the copolymer, preferably 0 to 0.8% by mass, more preferably 0.05 to 0.4% by mass, and still more preferably 0.1 to 0.3% by mass. The content of monomer unit that is copolymerizable with TFE and PPVE may be 0.1% by mass or less with respect to the whole of the monomer units.

The monomers copolymerizable with TFE and PPVE may include hexafluoropropylene (HFP), vinyl monomers represented by $CZ^1Z^2{=}CZ^3(CF_2)_nZ_4$ wherein $Z^1$, $Z^2$ and $Z^3$ are identical or different, and represent H or F; $Z^4$ represents H, F or Cl; and n represents an integer of 2 to 10, perfluoro (alkyl vinyl ether) [PAVE] represented by $CF_2{=}CF{-}ORf^1$ wherein $Rf^1$ is a perfluoroalkyl group having 1 to 8 carbon atoms (excluding PPVE), and alkyl perfluorovinyl ether derivatives represented by $CF_2{=}CF{-}OCH_2{-}Rf^1$ wherein $Rf^1$ represents a perfluoroalkyl group having 1 to 5 carbon atoms. Among these, HFP is preferred.

The copolymer is preferably at least one selected from the group consisting of a copolymer consisting only of the TFE unit and the PPVE unit, and a TFE/HFP/PPVE copolymer, and is more preferably a copolymer consisting only of a TFE unit and a PPVE unit.

The copolymer has a melt flow rate (MFR) of 11.0 to 16.0 g/10 min. The MFR of the copolymer is preferably 11.1 g/10 min or more, more preferably 11.5 g/10 min or more, even more preferably 12.0 g/10 min or more, particularly preferably 12.5 g/10 min or more, and most preferably 13.0 g/10 min or more, and is preferably 15.8 g/10 min or less, more preferably 15.6 g/10 min or less, even more preferably 15.4 g/10 min or less, particularly preferably 15.2 g/10 min or less, and most preferably 15.0 g/10 min or less. An excessively high MFR of the copolymer results in poor abrasion resistance at 60° C., solvent crack resistance, and durability against tensile force applied at 230° C. When the copolymer has an excessively low MFR, a visually attractive injection molded article having various shapes cannot be readily obtained by injection molding. Moreover, an excessively low MFR of the copolymer results in poor low hydrogen permeability, high-temperature rigidity at 100° C., and durability against repetitive load.

In the present disclosure, the MFR is a value obtained as a mass (g/10 min) of the polymer flowing out from a nozzle of 2.1 mm in inner diameter and 8 mm in length per 10 min at 372° C. under a load of 5 kg using a melt indexer, according to ASTM D1238.

The MFR can be regulated by regulating the kind and amount of a polymerization initiator to be used in polymerization of monomers, the kind and amount of a chain transfer agent, and the like.

The number of functional groups per $10^6$ main-chain carbon atoms of the copolymer is 50 or less. The number of functional groups per $10^6$ main-chain carbon atoms of the copolymer is preferably 40 or less, more preferably 30 or less, even more preferably 20 or less, yet more preferably 15 or less, particularly preferably 10 or less, and most preferably less than 6. An excessively large number of functional groups results in poor hydrogen permeability and tensile creep resistance at 230° C.

For identification of the kind of functional groups and measurement of the number of the functional groups, infrared spectroscopy can be used.

The number of the functional groups is measured, specifically, by the following method. First, the copolymer is formed by cold press to prepare a film of 0.25 to 0.30 mm in thickness. The film is analyzed by Fourier transform infrared spectroscopy to obtain an infrared absorption spectrum, and a difference spectrum against a base spectrum that is completely fluorinated and has no functional groups is obtained. From an absorption peak of a specific functional group observed on this difference spectrum, the number N of functional groups per $1\times10^6$ carbon atoms in the copolymer is calculated according to the following formula (A).

$$N = I \times K/t \quad \text{(A)}$$

I: absorbance
K: correction factor
t: thickness of film (mm)

For reference, for some functional groups, the absorption frequency, the molar absorption coefficient and the correction factor are shown in Table 1. Then, the molar absorption coefficients are those determined from FT-IR measurement data of low molecular model compounds.

TABLE 1

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —$COOCH_3$ | 1795 | 680 | 342 | $C_7F_{15}COOCH_3$ |
| —$CONH_2$ | 3436 | 506 | 460 | $C_7H_{15}CONH_2$ |
| —$CH_2OH_2$, —OH | 3648 | 104 | 2236 | $C_7H_{15}CH_2OH$ |
| —$CF_2H$ | 3020 | 8.8 | 26485 | $H(CF_2CF_2)_3CH_2OH$ |
| —$CF{=}CF_2$ | 1795 | 635 | 366 | $CF_2{=}CF_2$ |

Absorption frequencies of —$CH_2CF_2H$, —$CH_2COF$, —$CH_2COOH$, —$CH_2COOCH_3$ and —$CH_2CONH_2$ are lower by a few tens of kaysers ($cm^{-1}$) than those of —$CF_2H$, —COF, —COOH free and —COOH bonded, —$COOCH_3$ and —$CONH_2$ shown in the Table, respectively.

For example, the number of functional groups —COF is the total of the number of a functional group determined from an absorption peak having an absorption frequency of 1,883 $cm^{-1}$ derived from —$CF_2COF$ and the number of a functional group determined from an absorption peak having an absorption frequency of 1,840 $cm^{-1}$ derived from —$CH_2COF$.

The functional groups are ones present on main chain terminals or side chain terminals of the copolymer, and ones present in the main chain or the side chains. The number of functional groups may be the total number of —CF═$CF_2$, —CF H, —COF, —COOH, —$COOCH_3$, —$CONH_2$ and —$CH_2OH$.

The functional groups are introduced to the copolymer by, for example, a chain transfer agent or a polymerization initiator used for production of the copolymer. For example, in the case of using an alcohol as the chain transfer agent, or a peroxide having a structure of —$CH_2OH$ as a polymerization initiator, —$CH_2OH$ is introduced on the main chain terminals of the copolymer. Alternatively, the functional group is introduced on the side chain terminal of the copolymer by polymerizing a monomer having the functional group.

The copolymer satisfying the above range regarding the number of functional groups can be obtained by subjecting the copolymer to a fluorination treatment. That is, the copolymer of the present disclosure is preferably one which is subjected to the fluorination treatment. Further, the copolymer of the present disclosure preferably has —$CF_3$ terminal groups.

The melting point of the copolymer is preferably 295 to 315° C., more preferably 298° C. or higher, even more preferably 300° C. or higher, particularly preferably 301° C. or higher, and most preferably 302° C. or higher, and is more preferably 308° C. or lower. Due to the melting point being within the above range, the copolymer can be obtained that is capable of providing a formed article having even better abrasion resistance at 60° C., low hydrogen permeability, high-temperature rigidity at 100° C., tensile creep resistance at 230° C., durability against repetitive load, solvent crack resistance, and durability against tensile force applied at 230° C.

In the present disclosure, the melting point can be measured with a differential scanning calorimeter [DSC].

The hydrogen permeability coefficient of the copolymer is preferably 2,140 $cm^3 \cdot mm/(m^2 \cdot 24\ h \cdot atm)$ or less, and more preferably 2,000 $cm^3 \cdot mm/(m^2 \cdot 24\ h \cdot atm)$ or less. The content of PPVE unit, the melt flow rate (MFR), and the number of functional groups of the copolymer containing TFE unit and PPVE unit are suitably regulated, and therefore the copolymer of the present disclosure has excellent low hydrogen permeability.

In the present disclosure, the hydrogen permeability coefficient can be measured under conditions having a test temperature of 60° C. and a test humidity of 0% RH. Specific measurement of the hydrogen permeability coefficient can be carried out by the method described in the Examples.

The copolymer of the present disclosure can be produced by a polymerization method such as suspension polymerization, solution polymerization, emulsion polymerization, or bulk polymerization. The polymerization method is preferably emulsion polymerization or suspension polymerization. In these polymerization methods, conditions such as temperature and pressure, and a polymerization initiator and other additives can be suitably set depending on the composition and the amount of the copolymer.

As the polymerization initiator, an oil-soluble radical polymerization initiator, or a water-soluble radical polymerization initiator may be used.

The oil-soluble radical polymerization initiator may be a known oil-soluble peroxide, and examples thereof typically include:

- dialkyl peroxycarbonates such as di-n-propyl peroxydicarbonate, diisopropyl peroxydicarbonate, di-sec-butyl peroxydicarbonate, and di-2-ethoxyethyl peroxydicarbonate;
- peroxyesters such as t-butyl peroxyisobutyrate and t-butyl peroxypivalate;
- dialkyl peroxides such as di-t-butyl peroxide; and
- di[fluoro(or fluorochloro)acyl] peroxides.

The di[fluoro(or fluorochloro)acyl] peroxides include diacyl peroxides represented by [(RfCOO)—$]_2$ wherein Rf is a perfluoroalkyl group, an ω-hydroperfluoroalkyl group, or a fluorochloroalkyl group.

Examples of the di[fluoro(or fluorochloro) acyl] peroxides include di(ω-hydro-dodecafluoroheptanoyl) peroxide, di(ω-hydro-tetradecafluorooctanoyl) peroxide, di(@-hydro-hexadecafluorononanoyl) peroxide, di(perfluoropropionyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydrodo-decafluoroheptanoyl-ω-hydrohexadecafluorononanoyl peroxide, ω-chloro-hexafluorobutyryl-ω-chloro-decafluorohexanoyl peroxide, ω-hydrododecafluoroheptanoyl-perfluorobutyryl peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide, and di(undecachlorotriacontafluorodocosanoyl) peroxide.

The water-soluble radical polymerization initiator may be a known water-soluble peroxide, and examples thereof include ammonium salts, potassium salts and sodium salts of persulfuric acid, perboric acid, perchloric acid, perphosphoric acid, percarbonic acid and the like, organic peroxides such as disuccinoyl peroxide and diglutaroyl peroxide, and t-butyl permaleate and t-butyl hydroperoxide. A reductant such as a sulfite salt may be combined with a peroxide and used, and the amount thereof to be used may be 0.1 to 20 times with respect to the peroxide.

In the polymerization, a surfactant, a chain transfer agent and a solvent may be used, which are conventionally known.

The surfactant may be a known surfactant, and, for example, nonionic surfactants, anionic surfactants, and cationic surfactants may be used. Among these, fluorine-containing anionic surfactants are preferable, and more preferable are linear or branched fluorine-containing anionic surfactants having 4 to 20 carbon atoms, which may contain an ether bond oxygen (that is, an oxygen atom may be present between carbon atoms). The amount of the surfactant added (based on the polymerization water) is preferably 50 to 5,000 ppm.

Examples of the chain transfer agent include hydrocarbons such as ethane, isopentane, n-hexane, and cyclohexane; aromatics such as toluene and xylene; ketones such as acetone; acetate esters such as ethyl acetate and butyl acetate; alcohols such as methanol and ethanol; mercaptans such as methylmercaptan; and halogenated hydrocarbons such as carbon tetrachloride, chloroform, methylene chloride, and methyl chloride. The amount of the chain transfer agent to be added may vary depending on the chain transfer constant value of the compound to be used, but is usually in the range of 0.01 to 20% by mass with respect to the solvent in the polymerization.

The solvent may include water and mixed solvents of water and an alcohol.

In the suspension polymerization, in addition to water, a fluorosolvent may be used. The fluorosolvent may include hydrochlorofluoroalkanes such as $CH_3CClF_2$, $CH_3CCl_2F$, $CF_3CF_2CCl_2H$ and $CF_2ClCF_2CFHCl$; chlorofluoroalkanes such as $CF_2ClCFClCF_2CF_3$ and $CF_3CFClCFClCF_3$; hydrofluoroalkanes such as $CF_3CFHCFHCF_2CF_2CF_3$, $CF_2HCF_2CF_2CF_2CF_2H$, and $CF_3CF_2CF_2CF_2CF_2CF_2CF_2H$; hydrofluoroethers such as $CH_3OC_2F_5$, $CH_3OC_3F_5CF_3CF_2CH_2OCHF_2$, $CF_3CHFCF_2OCH_3$, $CHF_2CF_2OCH_2F$, $(CF_3)_2CHCF_2OCH_3$, $CF_3CF_2CH_2OCH_2CHF_2$, and $CF_3CHFCF_2OCH_2CF_3$; and perfluoroalkanes such as perfluorocyclobutane, $CF_3CF_2CF_2CF_3$, $CF_3CF_2CF_2CF_2CF_3$, and $CF_3CF_2CF_2CF_2CF_2CF_3$, and, among these, perfluoroalkanes are preferable. The amount of the fluorosolvent to be used is, from the viewpoint of suspendability and economic efficiency, preferably 10 to 100% by mass with respect to an aqueous medium.

The polymerization temperature is not limited, and may be 0 to 100° C. The polymerization pressure is suitably set depending on other polymerization conditions to be used such as the kind, the amount and the vapor pressure of the solvent, and the polymerization temperature, but may usually be 0 to 9.8 MPaG.

In the case of obtaining an aqueous dispersion containing the copolymer by the polymerization reaction, the copolymer can be recovered by coagulating, washing, and drying the copolymer contained in the aqueous dispersion. Then in the case of obtaining the copolymer as a slurry by the polymerization reaction, the copolymer can be recovered by taking out the slurry from a reaction container, and cleaning and drying the slurry. The copolymer can be recovered in a shape of powder by the drying.

The copolymer obtained by the polymerization may be formed into pellets. A method of forming into pellets is not limited, and a conventionally known method can be used. Examples thereof include methods of melt extruding the copolymer by using a single-screw extruder, a twin-screw extruder or a tandem extruder and cutting the resultant into a predetermined length to form the copolymer into pellets. The extrusion temperature in the melt extrusion needs to be varied depending on the melt viscosity and the production method of the copolymer, and is preferably from the melting point of the copolymer +20° C. to the melting point of the copolymer +140° C. A method of cutting the copolymer is not limited, and there can be adopted a conventionally known method such as a strand cut method, a hot cut method, an underwater cut method, or a sheet cut method. Volatile components in the obtained pellets may be removed by heating the pellets (degassing treatment). Alternatively, the obtained pellets may be treated by bringing the pellets into contact with hot water at 30 to 200° C., steam at 100 to 200° C., or hot air at 40 to 200° C.

Alternatively, the copolymer obtained by the polymerization may be subjected to fluorination treatment. The fluorination treatment can be carried out by bringing the copolymer having been subjected to no fluorination treatment into contact with a fluorine-containing compound. By the fluorination treatment, thermally unstable functional groups of the copolymer, such as —COOH, —$COOCH_3$, —$CH_2OH$, —COF, —CF═$CF_2$, and —$CONH_2$ and thermally relatively stable functional groups thereof, such as —$CF_2H$ can be converted to thermally very stable —$CF_3$. Consequently, the total number (the number of functional groups) of —COOH, —$COOCH_3$, —$CH_2OH$, —COF, —CF═$CF_2$, —$CONH_2$, and —$CF_2H$ of the copolymer can be easily regulated to the above-mentioned range.

The fluorine-containing compound is not limited, but includes fluorine radical sources generating fluorine radicals under the fluorination treatment condition. The fluorine radical sources include $F_2$ gas, $CoF_3$, $AgF_2$, $UF_6$, $OF_2$, $N_2F_2$, $CF_3OF$, and halogen fluorides (for example, $IF_5$ and $ClF_3$).

The fluorine radical source such as $F_2$ gas may be, for example, one having a concentration of 100%, but from the viewpoint of safety, the fluorine radical source is preferably mixed with an inert gas and diluted therewith to 5 to 50% by mass, and then used; and it is more preferably to be diluted to 15 to 30% by mass. The inert gas include nitrogen gas, helium gas and argon gas, but from the viewpoint of the economic efficiency, nitrogen gas is preferred.

The condition of the fluorination treatment is not limited, and the copolymer in a molten state may be brought into contact with the fluorine-containing compound, but the fluorination treatment can be carried out usually at a temperature of not higher than the melting point of the copolymer, preferably at 20 to 240° C., and more preferably at 100 to 220° C. The fluorination treatment is carried out usually for 1 to 30 hours and preferably 5 to 25 hours. The fluorination treatment is preferred which brings the copolymer having been subjected to no fluorination treatment into contact with fluorine gas ($F_2$ gas).

A composition may be obtained by mixing the copolymer of the present disclosure and as required, other components. The other components include fillers, plasticizers, processing aids, mold release agents, pigments, flame retarders, lubricants, light stabilizers, weathering stabilizers, electrically conductive agents, antistatic agents, ultraviolet absorbents, antioxidants, foaming agents, perfumes, oils, softening agents, and dehydrofluorination agents.

Examples of the fillers include silica, kaolin, clay, organo clay, talc, mica, alumina, calcium carbonate, calcium terephthalate, titanium oxide, calcium phosphate, calcium fluoride, lithium fluoride, crosslinked polystyrene, potassium titanate, carbon, boron nitride, carbon nanotube, and glass fiber. The electrically conductive agents include carbon black. The plasticizers include dioctyl phthalate and pentaerythritol. The processing aids include carnauba wax, sulfone compounds, low molecular weight polyethylene, and fluorine-based auxiliary agents. The dehydrofluorination agents include organic oniums and amidines.

As the above-mentioned other components, other polymers other than the copolymer may be used. The other polymers include fluororesins other than the copolymer, fluoroelastomer, and non-fluorinated polymers.

A method of producing the composition includes a method of dry mixing the copolymer and the other components, and a method of previously mixing the copolymer and the other components by a mixer and then melt kneading the mixture by a kneader, melt extruder or the like.

The copolymer of the present disclosure or the above-mentioned composition can be used as a processing aid, a forming material and the like, but use as a forming material is suitable. There can also be utilized aqueous dispersions, solutions and suspensions of the copolymer of the present disclosure, and the copolymer/solvent-based materials; and these can be used for application of coating materials, encapsulation, impregnation, and casting of films. However, since the copolymer of the present disclosure has the above-mentioned properties, it is preferable to use the copolymer as the forming material.

A formed article may be obtained by forming the copolymer of the present disclosure or the above composition.

A method of forming the copolymer or the composition is not limited, and includes injection molding, extrusion forming, compression molding, blow molding, transfer molding, rotomolding, and rotolining molding. The forming method, in particular, is preferably extrusion forming, compression molding, injection molding, and transfer molding; from the viewpoint of being able to produce formed articles in high productivity, more preferable are injection molding, extrusion forming, and transfer molding, and still more preferable is injection molding. That is, the formed article is preferably an extrusion formed article, a compression formed article, an injection molded article, or a transfer molded article; and from the viewpoint of being able to produce a formed article in high productivity, is more preferably an injection molded article, an extrusion formed article, or a transfer molded article, and is still more preferably an injection molded article.

The formed article containing the copolymer of the present disclosure may be, for example, a nut, a bolt, a joint, a film, a bottle, a gasket, an electric wire coating, a tube, a hose, a pipe, a valve, a sheet, a seal, a packing, a tank, a roller, a container, a cock, a connector, a filter housing, a filter cage, a flow meter, a pump, a wafer carrier, and a wafer box.

The formed article containing the copolymer of the present disclosure has excellent abrasion resistance at 60 ° C, low hydrogen permeability, high-temperature rigidity at 100 ° C, tensile creep resistance at 230° C., durability against repetitive load, solvent crack resistance, and durability against tensile force applied at 230 ° C, and, therefore, can be particularly suitably used as a piping member, a valve, a film, a tube, an electric wire coating, and the like.

The copolymer of the present disclosure, the above composition and the above formed article can be used, for example, in the following applications.

- Food packaging films, and members for liquid transfer for food production apparatuses, such as lining materials of fluid transfer lines, packings, sealing materials and sheets, used in food production processes;
- chemical stoppers and packaging films for chemicals, and members for chemical solution transfer, such as lining materials of liquid transfer lines, packings, sealing materials and sheets, used in chemical production processes;
- inner surface lining materials of chemical solution tanks and piping of chemical plants and semiconductor factories;
- members for fuel transfer, such as O (square) rings, tubes, packings, valve stem materials, hoses and sealing materials, used in fuel systems and peripheral equipment of automobiles, and such as hoses and sealing materials, used in ATs of automobiles;
- members used in engines and peripheral equipment of automobiles, such as flange gaskets of carburetors, shaft seals, valve stem seals, sealing materials and hoses, and other vehicular members such as brake hoses, hoses for air conditioners, hoses for radiators, and electric wire coating materials;
- members for chemical transfer for semiconductor production apparatuses, such as O (square) rings, tubes, packings, valve stem materials, hoses, sealing materials, rolls, gaskets, diaphragms and joints;
- members for coating and inks, such as coating rolls, hoses and tubes, for coating facilities, and containers for inks;
- members for food and beverage transfer, such as tubes, hoses, belts, packings and joints for food and beverage, food packaging materials, and members for glass cooking appliances;
- members for waste liquid transport, such as tubes and hoses for waste transport;
- members for high-temperature liquid transport, such as tubes and hoses for high-temperature liquid transport;
- members for steam piping, such as tubes and hoses for steam piping;
- corrosion-proof tapes for piping, such as tapes to be wound on piping of decks and the like of ships;
- various coating materials, such as electric wire coating materials, optical fiber coating materials, and transparent front side coating materials installed on the light incident side and back side lining materials of photoelectromotive elements of solar cells;
- diaphragms and sliding members such as various types of packings of diaphragm pumps;
- films for agriculture, and weathering covers for various kinds of roof materials, sidewalls and the like;
- interior materials used in the building field, and coating materials for glasses such as non-flammable fireproof safety glasses; and
- lining materials for laminate steel sheets used in the household electric field.

The fuel transfer members used in fuel systems of automobiles further include fuel hoses, filler hoses, and evap hoses. The above fuel transfer members can also be used as fuel transfer members for gasoline additive-containing fuels, resistant to sour gasoline, resistant to alcohols, and resistant to methyl tertiary butyl ether and amines and the like.

The above chemical stoppers and packaging films for chemicals have excellent chemical resistance to acids and the like. The above chemical solution transfer members also include corrosion-proof tapes to be wound on chemical plant pipes.

The above formed article also includes vehicular radiator tanks, chemical solution tanks, bellows, spacers, rollers and gasoline tanks, waste solution transport containers, high-temperature liquid transport containers and fishery and fish farming tanks.

The above formed article further includes members used for vehicular bumpers, door trims and instrument panels, food processing apparatuses, cooking devices, water-and oil-repellent glasses, illumination-related apparatuses, display boards and housings of OA devices, electrically illuminated billboards, displays, liquid crystal displays, cell phones, printed circuit boards, electric and electronic components, sundry goods, dust bins, bathtubs, unit baths, ventilating fans, illumination frames and the like.

The formed article containing the copolymer of the present disclosure can be suitably used as a member to be compressed such as a gasket or a packing. The member to be compressed of the present disclosure may be a gasket or a packing.

The size and shape of the members to be compressed of the present disclosure may suitably be set according to applications, and are not limited. The shape of the members to be compressed of the present disclosure may be, for example, annular. The members to be compressed of the present disclosure may also have, in plan view, a circular shape, an elliptical shape, a corner-rounded square or the like, and may be a shape having a through-hole in the central portion thereof.

The member to be compressed of the present disclosure is preferably used as a member that constitutes a non-aqueous electrolyte battery. The member to be compressed of the present disclosure is particularly suitable as a member that is used in a state of being in contact with a non-aqueous electrolyte in a non-aqueous electrolyte battery. That is, the member to be compressed of the present disclosure may have a surface that comes into contact with a non-aqueous electrolyte in a non-aqueous electrolyte battery.

The non-aqueous electrolyte batteries are not limited as long as being batteries having a non-aqueous electrolyte, and examples thereof include lithium ion secondary batteries and lithium ion capacitors. Members constituting the non-aqueous electrolyte batteries include sealing members and insulating members.

The non-aqueous electrolyte is not limited, and one or two or more of well-known solvents can be used such as propylene carbonate, ethylene carbonate, butylene carbonate, γ-butyllactone, 1,2-dimethoxyethane, 1,2-diethoxyethane, dimethyl carbonate, diethyl carbonate, and ethyl methyl carbonate. The non-aqueous electrolyte batteries may further have an electrolyte. The electrolyte is not limited, and may be $LiClO_4$, $LiAsF_6$, $LiPF_6$, $LiBF_4$, LiCl, LiBr, $CH_3SO_3Li$, $CF_3SO_3Li$, cesium carbonate, or the like.

The members to be compressed of the present disclosure can suitably be utilized, for example, as a sealing members such as sealing gaskets and sealing packings, and insulating members such as insulating gaskets or insulating packings. The sealing members are members to be used for preventing leakage of a liquid or a gas, or penetration of a liquid or a gas from outside. The insulating members are members to be used for insulating electricity. The members to be compressed of the present disclosure may also be members to be used for the purpose of both sealing and insulation.

The copolymer of the present disclosure can suitably be used as a material for forming an electric wire coating.

The coated electric wire has a core wire, and the coating layer installed on the periphery of the core wire and that containing the copolymer of the present disclosure. For example, an extrusion-formed article made by melt extruding the copolymer of the present disclosure on a core wire can be made into the coating layer. The coated electric wires are suitable to a high-frequency transmission cables, flat cables, heat-resistant cables and the like, and particularly to a high-frequency transmission cables.

As a material for core wire, for example, a metal conductor material such as copper or aluminum can be used. The core wire preferably one having a diameter of 0.02 to 3 mm. The diameter of the core wire is more preferably 0.04 mm or more, still more preferably 0.05 mm or more, and especially preferably 0.1 mm or more. The diameter of the core wire is more preferably 2 mm or less.

With regard to specific examples of the core wire, there may be used, for example, AWG (American Wire Gauge)-46 (solid copper wire of 40 μm in diameter), AWG-26 (solid copper wire of 404 μm in diameter), AWG-24 (solid copper wire of 510 μm in diameter), and AWG-22 (solid copper wire of 635 μm in diameter).

The coating layer is preferably one having a thickness of 0.1 to 3.0 mm. The thickness of the coating layer is also preferably 2.0 mm or less.

The high-frequency transmission cables include coaxial cables. The coaxial cables generally have a structure configured by laminating an inner conductor, an insulating coating layer, an outer conductor layer and a protective coating layer in order from the core part to the peripheral part. A formed article containing the copolymer of the present disclosure can suitably be utilized as the insulating coating layer containing the copolymer. The thickness of each layer in the above structure is not limited, but is usually: the diameter of the inner conductor is approximately 0.1 to 3 mm; the thickness of the insulating coating layer is approximately 0.3 to 3 mm; the thickness of the outer conductor layer is approximately 0.5 to 10 mm; and the thickness of the protective coating layer is approximately 0.5 to 2 mm.

Alternatively, the coating layer may one containing cells, and is preferably one in which cells are homogeneously distributed.

The average cell size of the cells is not limited, but is, for example, preferably 60 μm or smaller, more preferably 45 μm or smaller, still more preferably 35 μm or smaller, further still more preferably 30 μm or smaller, especially preferably 25 μm or smaller, and further especially preferably 23 μm or smaller. Then, the average cell size is preferably 0.1 μm or larger and more preferably 1 μm or larger. The average cell size can be determined by taking an electron microscopic image of an electric wire cross section, calculating the diameter of each cell by image processing, and averaging the diameters.

The foaming ratio of the coating layer may be 20% or higher, and is more preferably 30% or higher, still more preferably 33% or higher, and further still more preferably 35% or higher. The upper limit is not limited, and is, for example, 80%. The upper limit of the foaming ratio may be 60%. The foaming ratio is a value determined as ((the specific gravity of an electric wire coating material-the specific gravity of the coating layer)/(the specific gravity of the electric wire coating material)×100. The foaming ratio can suitably be regulated according to applications, for example, by regulation of the amount of a gas, described later, to be injected in an extruder, or by selection of the kind of a gas dissolving.

Alternatively, the coated electric wire may have another layer between the core wire and the coating layer, and may further have another layer (outer layer) on the periphery of the coating layer. In the case where the coating layer contains cells, the electric wire of the present disclosure may be of a two-layer structure (skin-foam) in which a non-foaming layer is inserted between the core wire and the coating layer, a two-layer structure (foam-skin) in which a non-foaming layer is coated as the outer layer, or a three-layer structure (skin-foam-skin) in which a non-foaming layer is coated as the outer layer of the skin-foam structure. The non-foaming layer is not limited, and may be a resin layer composed of a resin, such as a TFE/HFP-based copolymer, a TFE/PAVE copolymer, a TFE/ethylene-based copolymer, a vinylidene fluoride-based polymer, a polyolefin resin such as polyethylene [PE], or polyvinyl chloride [PVC].

The coated electric wire can be produced, for example, by using an extruder, heating the copolymer, extruding the copolymer in a melt state onto the core wire to thereby form the coating layer.

In formation of a coating layer, by heating the copolymer and introducing a gas in the copolymer in a melt state, the coating layer containing cells can be formed. As the gas, there can be used, for example, a gas such as chlorodifluoromethane, nitrogen or carbon dioxide, or a mixture thereof. The gas may be introduced as a pressurized gas into the heated copolymer, or may be generated by mingling a chemical foaming agent in the copolymer. The gas dissolves in the copolymer in a melt state.

Also, the copolymer of the present disclosure can suitably be utilized as a material for products for high-frequency signal transmission.

The products for high-frequency signal transmission are not limited as long as being products to be used for transmission of high-frequency signals, and include (1) formed boards such as insulating boards for high-frequency circuits, insulating materials for connection parts and printed wiring boards, (2) formed articles such as bases of high-frequency vacuum tubes and antenna covers, and (3) coated electric wires such as coaxial cables and LAN cables. The products for high-frequency signal transmission can suitably be used in devices utilizing microwaves, particularly microwaves of 3 to 30 GHz, in satellite communication devices, cell phone base stations, and the like.

In the products for high-frequency signal transmission, the copolymer of the present disclosure can suitably be used as an insulator in that the dielectric loss tangent is low.

As the (1) formed boards, printed wiring boards are preferable in that good electric property is provided. The printed wiring boards are not limited, but examples thereof include printed wiring boards of electronic circuits for cell phones, various computers, communication devices, and the like. As the (2) formed articles, antenna covers are preferable in that the low dielectric loss is low.

The formed article containing the copolymer of the present disclosure can be suitably utilized as a film or a sheet.

The film of the present disclosure is useful as a release film. The release film can be produced by forming the copolymer of the present disclosure by melt extrusion forming, calendering, press molding, casting, or the like. From the viewpoint that uniform thin films can be obtained, the release films can be produced by melt extrusion forming.

The film of the present disclosure can be applied to the surface of a roll that is used in OA devices. The copolymer of the present disclosure is formed into a required shape by extrusion forming, compression molding, press molding, or the like, such as a sheet, a film, or a tube, and can be used as a surface material of a roll, a belt, or the like of OA devices. In particular, a thin-wall tube and film can be produced by melt extrusion forming.

The formed article containing the copolymer of the present disclosure can be suitably used as a bottle, a tube, a joint, a valve, a piping member, and the like. These can be used to store or distribute a chemical solution.

So far, embodiments have been described above, but it is to be understood that various changes and modifications of patterns and details may be made without departing from the subject matter and the scope of the claims.

<1> According to the first aspect of the present disclosure, provided is:
- a copolymer, comprising tetrafluoroethylene unit and perfluoro(propyl vinyl ether) unit,
- wherein the copolymer has a content of perfluoro (propyl vinyl ether) unit of 4.4 to 5.2% by mass with respect to the whole of the monomer units,
- a melt flow rate at 372 ° C of 11.0 to 16.0 g/10 min, and the number of functional groups of 50 or less per $10^6$ main-chain carbon atoms.

<2> According to the second aspect of the present disclosure, provided is:
- the copolymer according to the first aspect, wherein the copolymer has a content of perfluoro(propyl vinyl ether) unit of 4.4 to 5.0% by mass with respect to the whole of the monomer units.

<3> According to the third aspect of the present disclosure, provided is:
- the copolymer according to the first or second aspect, wherein the copolymer has a melt flow rate at 372 ° C of 12.0 to 15.0 g/10 min.

<4> According to the fourth aspect of the present disclosure, provided is:
- an injection molded article, comprising the copolymer according to any one of the first to third aspects.

<5> According to the fifth aspect of the present disclosure, provided is:
- A formed article, comprising the copolymer according to any one of claims 1 to 3, wherein the formed article is a piping member, a valve, a film, a tube, or an electric wire coating.

EXAMPLES

The embodiments of the present disclosure will be described by Examples as follows, but the present disclosure is not limited only to these Examples.

Each numerical value in Examples was measured by the following methods.

Content of a Monomer Unit

The content of each monomer unit was measured by an NMR analyzer (for example, manufactured by Bruker BioSpin GmbH, AVANCE 300, high-temperature probe).

Melt Flow Rate (MFR)

The polymer was made to flow out from a nozzle of 2.1 mm in inner diameter and 8 mm in length at 372 ° C under a load of 5 kg by using a Melt Indexer G-01 (manufactured by Toyo Seiki Seisaku-sho, Ltd.) according to ASTM D1238, and the mass (g/10 min) of the polymer flowing out per 10 min was determined.

Number of Functional Groups

Pellets of the copolymer was formed by cold press into a film of 0.25 to 0.30 mm in thickness. The film was 40 times scanned and analyzed by a Fourier transform infrared spectrometer [FT-IR (Spectrum One, manufactured by PerkinElmer, Inc.)] to obtain an infrared absorption spectrum, and a difference spectrum against a base spectrum that was completely fluorinated and had no functional groups was obtained. From an absorption peak of a specific functional group observed on this difference spectrum, the number N of functional groups per $1\times10^6$ carbon atoms in a sample was calculated according to the following formula (A):

$$N = I \times K/t \tag{A}$$

I: absorbance
K: correction factor
t: thickness of film (mm)

Regarding the functional groups in the present disclosure, for reference, the absorption frequency, the molar absorption coefficient, and the correction factor are shown in Table 2.

The molar absorption coefficient are those determined from FT-IR measurement data of low molecular model compounds.

TABLE 2

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| $—COOCH_3$ | 1795 | 680 | 342 | $C_7F_{15}COOCH_3$ |
| $—CONH_2$ | 3436 | 506 | 460 | $C_7H_{15}CONH_2$ |
| $—CH_2OH_2$, —OH | 3648 | 104 | 2236 | $C_7H_{15}CH_2OH$ |
| $—CF_2H$ | 3020 | 8.8 | 26485 | $H(CF_2CF_2)_3CH_2OH$ |
| $—CF{=}CF_2$ | 1795 | 635 | 366 | $CF_2{=}CF_2$ |

Melting Point

The polymer was heated, as a first temperature raising step, at a temperature-increasing rate of 10 ° C/min from 200 ° C to 350 ° C, then cooled at a cooling rate of 10 ° C/min from 350 ° C to 200 ° C, and then again heated, as second temperature raising step, at a temperature-increasing rate of 10 ° C/min from 200 ° C to 350 ° C by using a differential scanning calorimeter (trade name: X-DSC7000, manufactured by Hitachi High-Tech Science Corporation), and the melting point was determined from a melting curve peak observed in the second temperature raising step.

Comparative Example 1

51.8 L of pure water was charged in 174 L-volume autoclave equipped with stirrer, nitrogen replacement was sufficiently carried out; thereafter, 40.9 kg of perfluorocyclobutane, 1.79 kg of perfluoro(propyl vinyl ether) (PPVE) and 4.30 kg of methanol were charged; the temperature in the system was maintained at 35 ° C. Then, tetrafluoroethylene (TFE) was introduced under pressure up to 0.64 MPa, and thereafter 0.051 kg of a 50% methanol solution of di-n-propyl peroxydicarbonate was charged to initiate polymerization. Since the pressure in the system decreased along with the progress of the polymerization, TFE was continuously supplied to make the pressure constant, and 0.042 kg of PPVE was additionally charged for every 1 kg of TFE supplied. The polymerization was finished at the time when the amount of TFE additionally charged reached 40.9 kg. Unreacted TFE was released to return the pressure in the autoclave to the atmospheric pressure, and thereafter, an obtained reaction product was washed with water and dried to obtain 42.5 kg of a powder.

The obtained powder was melt extruded at 360 ° C with a screw extruder (trade name: PCM46, manufactured by Ikegai Corp) to thereby obtain pellets of a copolymer. The PPVE content of the obtained pellets was measured by the method described above.

The obtained pellets were put in a vacuum vibration-type reactor VVD-30 (manufactured by Okawara MFG. Co., Ltd.), and heated to 210 ° C. After vacuumizing, $F_2$ gas diluted to 20% by volume with $N_2$ gas was introduced to the atmospheric pressure. 0.5 hour after the $F_2$ gas introduction, vacuumizing was once carried out and Fe gas was again introduced. Further, 0.5 hour thereafter, vacuumizing was again carried out and $F_2$ gas was again introduced. Thereafter, while the above operation of the $F_2$ gas introduction and vacuumizing was carried out once every 1 hour, and the reaction was carried out at a temperature of 210 ° C for 10 hours. After the reaction was finished, the reactor interior was replaced sufficiently by Ne gas to finish the fluorination reaction. By using the fluorinated pellet, various physical properties were measured by the methods described above.

Comparative Example 2

Fluorinated pellets were obtained as in Comparative Example 1, except for changing the amount of PPVE to 1.92 kg, changing the amount of methanol to 4.79 kg, adding 0.044 kg of PPVE for every 1 kg of TFE supplied, to thereby obtain 42.7 kg of a dry powder.

Comparative Example 3

Fluorinated pellets were obtained as in Comparative Example 1, except for changing the amount of PPVE to 2.05 kg, changing the amount of methanol to 0.33 kg, changing the amount of the 50% methanol solution of di-n-propyl peroxydicarbonate to 0.103 kg, adding 0.046 kg of PPVE for every 1 kg of TFE supplied, to thereby obtain 42.8 kg of a dry powder.

Comparative Example 4

Fluorinated pellets were obtained as in Comparative Example 1, except for changing the amount of PPVE to 2.69 kg, changing the amount of methanol to 2.48 kg, adding 0.057 kg of PPVE for every 1 kg of TFE supplied, to thereby obtain 43.2 kg of a dry powder.

Comparative Example 5

Fluorinated pellets were obtained as in Comparative Example 1, except for changing the amount of PPVE to 2.43 kg, changing the amount of methanol to 1.75 kg, adding 0.053 kg of PPVE for every 1 kg of TFE supplied, to thereby obtain 41.0 kg of a dry powder.

Comparative Example 6

Non-fluorinated pellets were obtained as in Comparative Example 1, except for changing the amount of PPVE to 2.43 kg, changing the amount of methanol to 3.36 kg, adding 0.053 kg of PPVE for every 1 kg of TFE supplied, to thereby obtain 43.1 kg of a dry powder.

Example 1

Fluorinated pellets were obtained as in Comparative Example 1, except for changing the amount of PPVE to 2.05 kg, changing the amount of methanol to 3.43 kg, adding 0.046 kg of PPVE for every 1 kg of TFE supplied, to thereby obtain 42.8 kg of a dry powder.

Example 2

Fluorinated pellets were obtained as in Comparative Example 1, except for changing the amount of PPVE to 2.17 kg, changing the amount of methanol to 3.45 kg, adding 0.048 kg of PPVE for every 1 kg of TFE supplied, to thereby obtain 42.9 kg of a dry powder.

Example 3

Fluorinated pellets were obtained as in Comparative Example 1, except for changing the amount of PPVE to 2.30 kg, changing the amount of methanol to 3.24 kg, adding 0.050 kg of PPVE for every 1 kg of TFE supplied, to thereby obtain 43.0 kg of a dry powder.

Example 4

Fluorinated pellets were obtained as in Comparative Example 1, except for changing the amount of PPVE to 2.43 kg, changing the amount of methanol to 3.19 kg, adding 0.053 kg of PPVE for every 1 kg of TFE supplied, changing the raised temperature of the vacuum vibration-type reactor to 180 ° C, changing the reaction condition at a temperature of 180 ° C and 10 hours, to thereby obtain 43.1 kg of a dry powder.

By using the pellets obtained in the Examples and the Comparative Examples, various physical properties were measured by the methods described above. The results are shown in Table 3.

TABLE 3

| | PPVE content (% by mass) | MFR (g/10 min) | Number of functional groups (groups/C$10^6$) | Melting point (°C) |
|---|---|---|---|---|
| Comparative Example 1 | 4.0 | 13.0 | <6 | 305 |
| Comparative Example 2 | 4.2 | 16.2 | <6 | 304 |
| Comparative Example 3 | 4.4 | 17.6 | <6 | 304 |
| Comparative Example 4 | 5.4 | 15.0 | <6 | 302 |
| Comparative Example 5 | 5.0 | 10.0 | <6 | 302 |
| Comparative Example 6 | 5.0 | 14.2 | 235 | 302 |
| Example 1 | 4.4 | 12.0 | <6 | 304 |
| Example 2 | 4.6 | 13.0 | <6 | 304 |
| Example 3 | 4.8 | 14.0 | <6 | 303 |
| Example 4 | 5.0 | 15.0 | 15 | 302 |

The description of "<6" in Table 3 means that the number of functional groups is less than 6.

Then, by using the obtained pellets, the following properties were evaluated. The results are shown in Table 4.

Abrasion Test

By using the pellets and a heat press molding machine, a sheet-shape test piece of approximately 0.2 mm in thickness was prepared, and a test piece having 10 cm×10 cm was cut out therefrom. The prepared test piece was fixed to a test bench of a Taber abrasion tester (No. 101-H Taber type abrasion tester with an option, manufactured by Yasuda Seiki Seisakusho, Ltd.), and the abrasion test was carried out using the Taber abrasion tester under conditions involving a test piece surface temperature of 60 ° C, a load of 500 g, an abrasion wheel CS-10 (rotationally polished in 20 rotations with an abrasive paper #240), and a rotation rate of 60 rpm. The weight of the test piece after 1,000 rotations was measured, and the same test piece was further subjected to the test of 6,500 rotations, and then the weight of the test piece was measured. The abrasion loss was determined by the following formula.

$$\text{Abrasion loss (mg)} = M1 - M2$$

M1: weight of test piece after 1,000 rotations (mg)
M2: weight of test piece after 6,500 rotations (mg)

Hydrogen Permeability Coefficient

By using the pellets and a heat press molding machine, a sheet-shape test piece of approximately 0.1 mm in thickness was prepared. Using the obtained test piece, hydrogen permeability was measured with a differential pressure type gas permeation meter (L100-5000 gas permeability meter, manufactured by Systech Illinois) according to the method described in JIS K7126-1:2006. The hydrogen permeability value at a permeation area of 50.24 $cm^2$ at a test temperature of 60 ° C at a test humidity of 0% RH was obtained. The obtained hydrogen permeability and the test piece thickness were used to calculate the hydrogen permeability coefficient from the following equation.

$$\text{Hydrogen permeability coefficient } (\text{cm}^3 \cdot \text{mm}/(\text{m}^2 \cdot 24 \text{ h} \cdot \text{atm})) = GTR \times d$$

GTR: hydrogen permeability ($cm^3/(m^2 \cdot 24$ h·atm))
d: test piece thickness (mm)

Rate of Deflection at 100 ° C. Under Load

By using the pellets and a heat press molding machine, a sheet-shape test piece of approximately 3.0 mm in thickness was prepared, and a test piece having 80×10 mm was cut out therefrom and heated in an electric furnace at 100 ° C for 20 hours. Except that the obtained test piece was used, a test was carried out according to the method described in JIS K-K 7191-1 with a heat distortion tester (manufactured by Yasuda Seiki Seisakusho, Ltd.) under conditions involving a test temperature of 30 to 150 ° C, a temperature-increasing rate of 120 ° C/hour, a bending stress of 1.8 MPa, and a flatwise method. The rate of deflection under load was determined by the following formula. A sheet, the rate of deflection at 100 ° C under load of which is small, has excellent rigidity at a high temperature.

$$\text{Rate of deflection under load (\%)} = a2/a1 \times 100$$

a1: thickness of specimen before test (mm)
a2: amount of deflection at 100 ° C (mm)

Tensile Creep Test

Tensile creep strain was measured using TMA-7100 manufactured by Hitachi High-Tech Science Corporation.

By using the pellets and a heat press molding machine, a sheet-shape test piece of approximately 0.1 mm in thickness was prepared, and a sample having a width of 2 mm and a length of 22 mm was prepared from the sheet. The sample was attached to the measurement jigs, with the distance between the jigs being 10 mm. A load was applied to the sample such that the cross-sectional load was 2.63 N/mm$^2$, the sample was left to stand at 230 ° C, the displacement (mm) of the length of the sample from 90 minutes after the beginning of the test to 555 minutes after the beginning of the test was measured, and the ratio of the displacement (mm) of the length to the initial sample length (10 mm) (tensile creep strain (%)) was calculated. A sheet, the tensile creep strain (%) of which measured under conditions involving a temperature of 230 ° C and for 555 minutes is small, is hardly elongated even when a tensile load is applied in an extremely high-temperature environment, and has excellent high temperature tensile creep properties.

Tensile Strength After 80,000 Cycles

The tensile strength after 80,000 cycles was measured using a fatigue tester MMT-250NV-10 manufactured by Shimadzu Corporation. By using the pellets and a heat press molding machine, a sheet-shape test piece of approximately 2.4 mm in thickness was prepared, and an ASTM D1708 micro-dumbbell was used to prepare a dumbbell-shaped sample (thickness 2.4 mm, width 5.0 mm, length of measured portion 22 mm). The sample was attached to a measuring jig, and with the sample being attached, the measuring jig was put in a constant-temperature vessel at 150 ° C. The sample was cyclically pulled in the uniaxial direction at a stroke of 0.2 mm and a frequency of 100 Hz, and the tensile strength for each pull (the tensile strength when the stroke was +0.2 mm) was measured. The tensile strength after 80,000 cycles was calculated from the measured values according to the following formula. In this Example, the cross-sectional area of the sample is 12.0 mm$^2$.

$$\text{Tensile strength after 80,000 cycles } (\text{mN/mm}^2) = \text{tensile strength } (\text{80,000 cycles})(\text{mN}) / \text{cross-sectional area of sample } (\text{mm}^2)$$

The tensile strength after 80,000 cycles is the ratio of the tensile strength when repetitive load was applied 80,000 times to the cross-sectional area of the sample. A sheet having a high tensile strength after 80,000 cycles maintains a high tensile strength even after the load is applied 80,000 times, and has excellent durability against repetitive load.

85% Phosphoric Acid Immersion Crack Test (Chemical Immersion Crack Test)

The pellets and a heat press molding machine were used to prepare a formed article having a thickness of about 2 mm. Three test pieces were obtained by being punched out from the obtained sheet using a rectangular dumbbell having 13.5 mm×38 mm. A notch was made in the center of the long side of each obtained test piece with a 19 mm×0.45 mm blade, according to ASTM D1693. Three notched test pieces and 25 g of an 85% aqueous phosphoric acid solution were introduced into a 100 mL container and heated in an electric furnace at 120 ° C for 20 hours, and then the notched test pieces were removed. The obtained three notched test pieces were attached to a stress-cracking test jig, according to ASTM D1693 and heated in an electric furnace at 200 ° C for 24 hours, the notch and the surrounding area thereof were visually checked to count the number of cracks. A crack-free sheet has excellent solvent crack resistance even after being immersed in a chemical solution.

Good: 0 cracks

Poor: 1 or more cracks

Injection Moldability

Conditions

The copolymer was injection-molded by using an injection molding machine (SE50EV-A, manufactured by Sumitomo Heavy Industries, Ltd.) set at a cylinder temperature of 390 ° C, a metal mold temperature of 200 ° C, and an injection speed of 10 mm/s. As a metal mold, a metal mold (100 mm×100 mm×2 mmt, side gate) obtained by Cr-plating HPM38 was used. The obtained injection molded article was observed, and evaluated according to the following criteria. The presence/absence of surface roughness was checked by touching the surface of the injection molded article.

Evaluations (Visual)

2: The whole surface was smooth, and no flow marks were observed on the whole formed article.

1: Roughness was confirmed on the surface within the region of 1 cm from the portion where the gate of the metal mold had been positioned, or flow marks were observed within the region of 1 cm from the portion where the gate of the metal mold had been positioned, but in other areas, the whole surface was smooth, and no flow marks were observed.

0: Roughness was confirmed on the surface within the region of 4 cm from the portion where the gate of the metal mold had been positioned, or flow marks were observed within the region of 4 cm from the portion where the gate of the metal mold had been positioned.

Tensile Strength at 230 ° C

The pellets and a heat press molding machine were used to obtain a test piece (compression-molded) having a thickness of about 2.0 mm. A dumbbell-shaped test piece was cut out from the above test piece using an ASTM Type V dumbbell, and the tensile strength of the obtained dumbbell-shaped test piece was measured at 230 ° C under a condition of 50 mm/min using an Autograph (AG-I 300kN manufactured by Shimadzu Corporation), according to ASTM D638.

A formed article having a high tensile strength at 230 ° C unlikely breaks even when tensile force is applied at high temperatures.

Film Formability

The obtained pellets were used to produce a film with a T-die in an extruder having q14 mm (manufactured by Imoto Machinery Co., Ltd.). Conditions of extrusion forming are as follows.

a) Take-up speed: 1 m/min b) Roll temperature: 120 ° C c) Film width: 70 mm d) Thickness: 0.10 mm e) Extrusion conditions:

$$\text{Single-screw extruder with a cylinder screw diameter} = 14\ \text{mm and}\ L/D = 20$$

Set temperature of extruder: barrel section C-1 (330 ° C), barrel section C-2 (350° C.), barrel section C-3 (370 ° C), T-die section (380 ° C)

The obtained film was visually checked and confirmed as having no problem with its appearance.

Conditions for Forming Electric Wire Coating

Extrusion coating in the following coating thickness was carried out on a copper conductor having a conductor diameter of 0.50 mm with a 30-mmφ electric wire coating forming machine (manufactured by Tanabe Plastics Machinery Co., Ltd.) to give a coated electric wire. The extrusion conditions for the electric wire coating were as follows.

a) Core conductor: 0.50 mm in conductor diameter b) Coating thickness: 0.20 mm c) Coated electric wire diameter: 0.90 mm d) Electric wire take-over speed: 50 m/min e) Extrusion conditions:

$$\text{Single-screw extruder having cylinder screw diameter} = 30\ \text{mm},\ L/D = 22$$

$$\text{Die (inner diameter)/tip (outer diameter)} = 8.0\ \text{mm}/5.0\ \text{mm}$$

Set temperature of extruder: barrel section C-1 (330 ° C), barrel section C-2 (360 ° C), barrel section C-3 (375 ° C), head section H (390 ° C), die section D-1 (405 ° C), die section D-2 (395 ° C). Preliminary heating of the core wire was set to 80 ° C.

The obtained electric wire was visually checked and confirmed as having no problem with its appearance.

[Table 4]

TABLE 4

| | Abrasion loss at 60 °C (mg) | Hydrogen permeability coefficient ($cm^3 \cdot mm/(m^2 \cdot 24\ h \cdot atm)$) | Rate of deflection at 100 °C under load (%) | Tensile creep strain at 230 °C (%) | Tensile strength after 80,000 cycles ($mN/mm^2$) | Chemical immersion crack test | Injection mold-ability | 230 °C Tensile strength (MPa) | Injection mold-ability | Fim form-ability | Electric wire form-ability |
|---|---|---|---|---|---|---|---|---|---|---|---|
| Comparative Example 1 | 19.5 | 1829 | 75% | 1.94 | 463 | poor | 2 | 8.6 | 2 | good | good |
| Comparative Example 2 | 20.8 | 1800 | 75% | 2.13 | 471 | poor | 2 | 8.3 | 2 | — | good |
| Comparative Example 3 | 20.8 | 1830 | 76% | 2.27 | 450 | poor | 2 | 8.3 | 2 | good | — |
| Comparative Example 4 | 17.5 | 2101 | 88% | 3.11 | 314 | good | 2 | 9.4 | 2 | — | good |
| Comparative Example 5 | 15.4 | 2137 | 87% | 2.49 | 338 | good | 0 | 10.1 | 2 | — | — |
| Comparative Example 6 | 18.0 | 2258 | 83% | 3.13 | 392 | good | 2 | 9.2 | 2 | — | — |
| Example 1 | 17.7 | 1927 | 79% | 2.16 | 427 | good | 1 | 9.2 | 1 | good | good |
| Example 2 | 17.8 | 1948 | 80% | 2.34 | 407 | good | 2 | 9.2 | 2 | good | good |
| Example 3 | 17.9 | 1970 | 82% | 2.52 | 386 | good | 2 | 9.1 | 2 | good | good |
| Example 4 | 18.1 | 1999 | 83% | 2.73 | 372 | good | 2 | 9.1 | 2 | good | good |

The invention claimed is:

1. A copolymer, comprising tetrafluoroethylene unit and perfluoro (propyl vinyl ether) unit, wherein the copolymer has a content of perfluoro (propyl vinyl ether) unit of 4.4 to 5.2% by mass with respect to the whole of the monomer units, a melt flow rate at 372 °C under a load of 5 kg of 11.0 to 16.0 g/10 min, and the total number of —CF—$CF_2$, —$CF_2H$, —COF, —COOH, —$COOCH_3$, —$CONH_2$ and —$CH_2OH$ of 50 or less per $10^6$ main-chain carbon atoms.

2. The copolymer according to claim 1, wherein the copolymer has a content of perfluoro (propyl vinyl ether) unit of 4.4 to 5.0% by mass with respect to the whole of the monomer units.

3. The copolymer according to claim 1, wherein the copolymer has a melt flow rate at 372 ° C of 12.0 to 15.0 g/10 min.

4. An injection molded article, comprising the copolymer according to claim 1.

* * * * *